(12) United States Patent
Gimson et al.

(10) Patent No.: US 8,301,722 B2
(45) Date of Patent: Oct. 30, 2012

(54) ASSOCIATING VERSION INFORMATION WITH A COMPONENT DOCUMENT OF A MODULAR DOCUMENT

(75) Inventors: Roger Brian Gimson, Bristol (GB); Robert Thomas Owen Rees, Newport (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 451 days.

(21) Appl. No.: 12/511,523

(22) Filed: Jul. 29, 2009

(65) Prior Publication Data

US 2011/0029634 A1 Feb. 3, 2011

(51) Int. Cl.
*G06F 15/16* (2006.01)
(52) U.S. Cl. ....................................................... 709/217
(58) Field of Classification Search ................... 709/217
See application file for complete search history.

(56) References Cited

U.S. PATENT DOCUMENTS

| | | | | |
|---|---|---|---|---|
| 6,078,934 | A * | 6/2000 | Lahey et al. | 715/205 |
| 6,185,734 | B1 * | 2/2001 | Saboff et al. | 717/164 |
| 6,377,956 | B1 * | 4/2002 | Hsu et al. | 1/1 |
| 7,865,465 | B2 * | 1/2011 | Vierich et al. | 707/615 |
| 7,899,883 | B2 * | 3/2011 | Rasmussen et al. | 709/217 |
| 2003/0144982 | A1 * | 7/2003 | Reulein et al. | 707/1 |
| 2004/0015369 | A1 * | 1/2004 | Kim et al. | 705/1 |
| 2004/0216048 | A1 * | 10/2004 | Brown et al. | 715/530 |
| 2005/0268221 | A1 * | 12/2005 | Shur et al. | 715/513 |
| 2007/0244935 | A1 * | 10/2007 | Cherkasov | 707/203 |
| 2007/0255694 | A1 * | 11/2007 | Wu | 707/3 |
| 2008/0028300 | A1 * | 1/2008 | Krieger et al. | 715/255 |
| 2008/0104493 | A1 * | 5/2008 | Rees et al. | 715/200 |
| 2008/0104497 | A1 * | 5/2008 | Lumley et al. | 715/209 |
| 2008/0104504 | A1 * | 5/2008 | Gimson et al. | 715/234 |
| 2008/0104508 | A1 * | 5/2008 | Lumley et al. | 715/255 |
| 2009/0157811 | A1 * | 6/2009 | Bailor et al. | 709/204 |
| 2009/0327358 | A1 * | 12/2009 | Lukiyanov et al. | 707/203 |
| 2010/0318898 | A1 * | 12/2010 | Rees et al. | 715/236 |
| 2010/0318982 | A1 * | 12/2010 | Lumley et al. | 717/168 |
| 2011/0029482 | A1 * | 2/2011 | Gimson et al. | 707/624 |
| 2011/0029594 | A1 * | 2/2011 | Owen Rees et al. | 709/203 |
| 2011/0029851 | A1 * | 2/2011 | Rees et al. | 715/209 |
| 2011/0035811 | A1 * | 2/2011 | Rees et al. | 726/29 |
| 2012/0042355 | A1 * | 2/2012 | Morris et al. | 726/1 |

OTHER PUBLICATIONS

W3C. "XML Inclusions (XInclude) Version 1.0 (Second Edition)" Nov. 15, 2006. pp. 1-20.*
GNU Project. "Concurrent Versions System—Summary" May 8, 2008. pp. 1-3.*
Lumley et al., U.S. Appl. No. 12/482,646 entitled "Updating Electronic Documents" filed Jun. 11, 2009, 21 pages.
Rees et al., U.S. Appl. No. 12/483,036 entitled "Rendering Definitions" filed Jun. 11, 2009, 25 pages.
Rees et al., U.S. Appl. No. 12/537,493 entitled "Providing an Access Mechanism Associated With a Document Part to Determine an Action to Take if Content of the Document Part is Inaccessible" filed Aug. 7, 2009, 24 pages.

(Continued)

*Primary Examiner* — Imad Hussain

(57) ABSTRACT

A modular document composed of plural component documents that are combined to allow presentation of the modular document is provided. The modular document contains references to the component documents. Version information is associated with at least one of the references to identify one of plural versions of a corresponding particular one of the component documents.

16 Claims, 5 Drawing Sheets

OTHER PUBLICATIONS

Gimson et al., U.S. Appl. No. 12/511,500 entitled "Synchronizing a Change of a Modular Document" filed Jul. 29, 2009, 23 pages.

Rees et al., U.S. Appl. No. 12/511,513 entitled "Merging Instances of a Modular Document" filed Jul. 29, 2009, 24 pages.

Rees et al., U.S. Appl. No. 12/511,507 entitled "Sending a Subset of Component Documents of a Modular Document to an Electronic Device" filed Jul. 29, 2009, 20 pages.

* cited by examiner

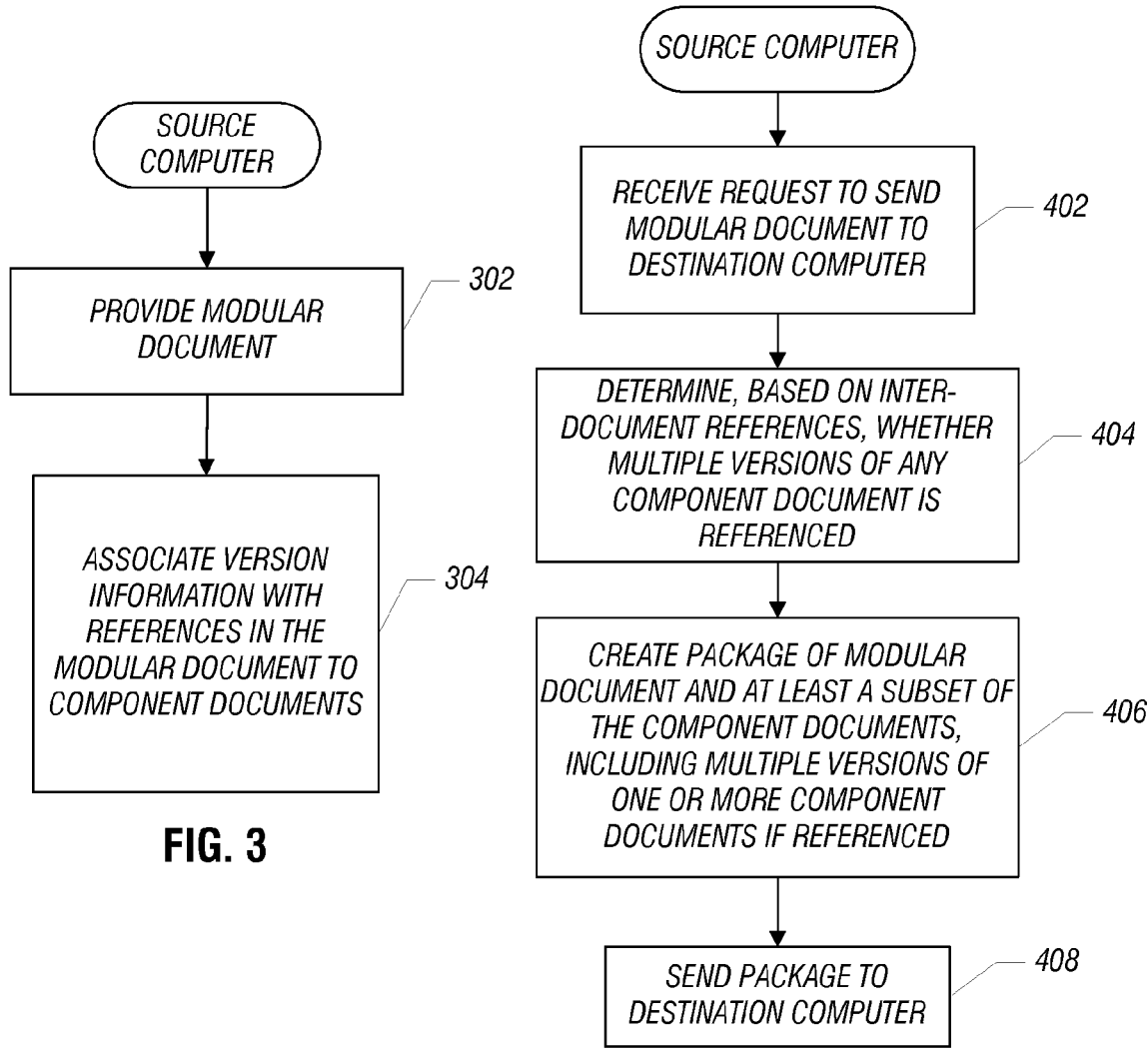

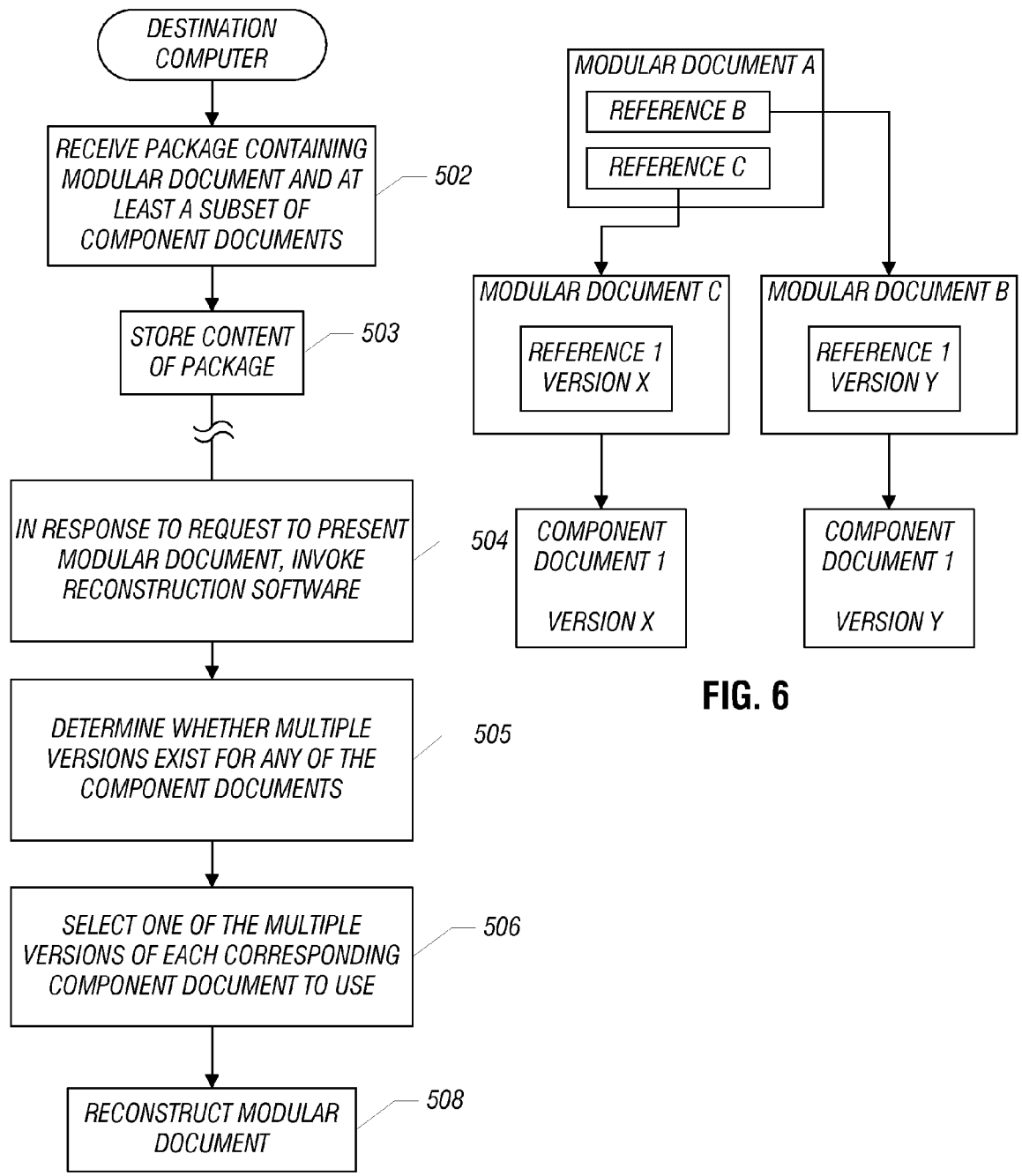

ASSOCIATING VERSION INFORMATION WITH A COMPONENT DOCUMENT OF A MODULAR DOCUMENT

BACKGROUND

A document can be modified one or more times such that multiple versions of the document exist. Typically, version control of a document is applied to the entire document. For example, a word processing document (such as a document produced by the Microsoft Word application) allows a history of versions to be stored in the document. Previous versions of the word processing document may be retrieved upon request.

However, applying version control to the entire document lacks flexibility.

BRIEF DESCRIPTION OF THE DRAWINGS

Some embodiments of the invention are described with respect to the following figures:

FIGS. 3 and 4 are flow diagrams of processes performed by a source computer that use version information associated with a modular document, in accordance with some embodiments;

FIG. 5 is a flow diagram of a process of reconstructing a modular document that uses version information associated with the modular document, in accordance with an embodiment;

FIGS. 6 and 7 show examples of inter-document references referring to multiple versions of a component document, in accordance with an embodiment;

DETAILED DESCRIPTION

Figure 1:
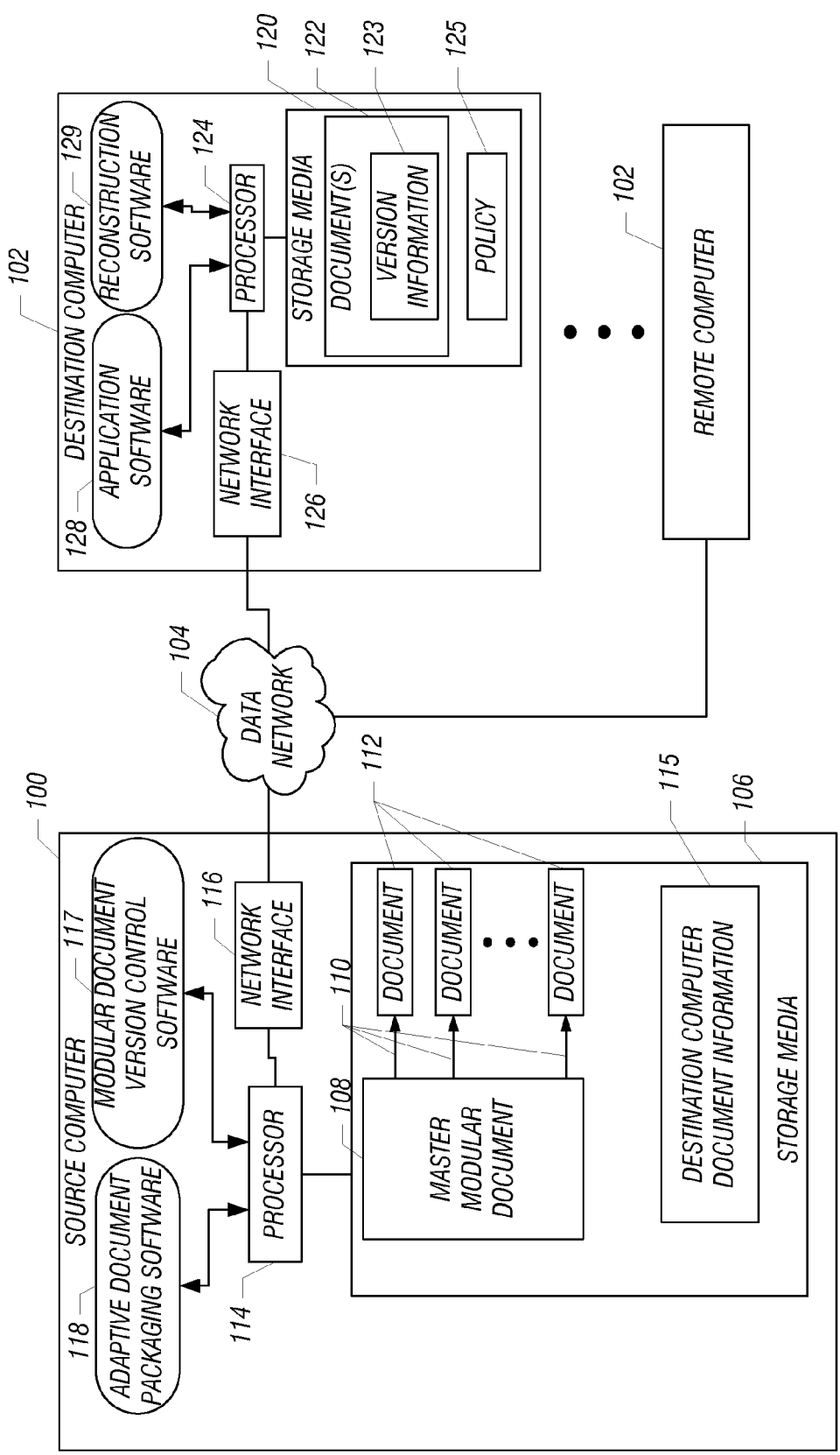
FIG. 1 is a block diagram of an exemplary arrangement that includes a source computer and destination computers, in which an embodiment of the invention can be incorporated.

Documents can be in modular form to provide for enhanced flexibility and improved efficiency. A "modular document" refers to a document that is composed of separately identifiable component documents. A "document" refers to a container of data that is identifiable.

The component documents of a modular document are combined to allow for proper presentation (e.g., viewing or listening) of the modular document. Combining of the component documents also achieves a desired behavior of the modular document (e.g., load appropriate objects such as images or text, retrieve variable data from a selected source or sources, etc.). Some component documents can be shared by multiple modular documents, and any one of the component documents of a modular document can be modified or replaced. A modular document generally refers to any data structure container that has references to other documents that in combination make up the modular document.

In one example, a modular document can include the following component documents: a component document containing branding information (such as company logo) that is added to an output of the modular document; a component document containing style information related to the modular document; a component document containing legal notices; a component document containing product images; a component document containing descriptions of a product; a component document containing terms and conditions associated with the sale of a product; and so forth. By using a modular document that is composed of multiple component documents, it is possible to modify the modular document by changing just one or more of the component documents. This enhances efficiency since the entire modular document does not have to be changed in response to a change in the component document.

When a component document in a modular document changes, there is a choice regarding whether a reference to the component document should resolve to a current version of the component document or to a previous version of a component document. Different applications may specify different resolutions. For example, if a company logo changes, a template document that refers to the logo document containing the company logo may want to refer to the latest logo, while an existing modular document that refers to the logo document may wish to continue to refer to the previous logo.

In accordance with some embodiments, a modular document that contains a reference to a component document can associate version information with the reference to allow the version of the referenced component document to be identified such that the appropriate version of the component document can be selected when the modular document is reconstructed. In some embodiments, a reference in a modular document to a component document contains a unique global identifier of the component document as well as version information regarding the component document to identify one of multiple versions of the component document. In some implementations, the version information can include a timestamp to indicate a time at which the corresponding version of the component document was created (or modified).

A modular document can be communicated over a network between a source electronic device and a destination electronic device. Examples of source and destination electronic devices include one or more of the following: desktop computers, notebook computers, server computers, personal digital assistants (PDAs), smart phones, gaming consoles, music/video players, or other types of electronic devices.

The destination electronic device can use the version information contained in the modular document that is sent from the source electronic device to select the desired version of a component document for reconstructing the modular document. In some implementations, the destination electronic device can simply use the version of the component document identified in a package received from the source electronic device for the modular document. In other implementations, the destination electronic device can be programmed to always select the version of a component document that is stored locally at the destination electronic device, rather than the version received.

In yet other implementations, the destination electronic device always selects a latest version of the component document for reconstructing the modular document. For example, the package received from the source electronic device can contain a first version, while the destination electronic device may locally store a second version of the component document. The destination electronic device can compare the first and second versions to determine which version is the latest for use to reconstruct the modular document (and more specifically timestamp information).

As yet another alternative, the destination electronic device can access policy information stored at the destination electronic device to determine which of multiple versions to use.

The policy information can specify selection of different versions of a given component document depending upon a corresponding one of plural different applications. For example, for a first type of modular document (e.g., a template), the policy information can specify that a latest version of the given component document is to be used for reconstructing the modular document. As another example, the policy information can specify that an earlier version of the given document is to be used for a second type of modular document (e.g., a previously stored word processing document).

FIG. 1 is a block diagram of an exemplary arrangement that includes a source computer 100 (or other source electronic device) and one or more destination computers 102 (or other destination electronic devices) that are coupled over a data network 104 to the source computer 100. Examples of the data network 104 include any one or more of a local area network (LAN), a wide area network (WAN), the Internet, and so forth (whether wired or wireless).

The source computer 100 includes storage media 106, which can be implemented with one or more disk-based storage devices and/or one or more integrated circuit (IC) or semiconductor memory devices. As shown in the example in FIG. 1, the storage media 106 contains a modular document 108 that references 110 multiple component documents 112. Although just one modular document 108 is shown, it is noted that the storage media 106 can contain more than one modular document.

It is also noted that in some applications, at least one of the component documents 112 can itself be a modular document that references other component documents. Thus, generally, a first modular document can reference component documents, where it is possible that at least one of the component documents is a second modular document that in turn references additional component documents. Moreover, it is also possible that at least one of the additional component documents is a third modular document that references further component documents. This hierarchical referencing of modular documents can be performed to any depth.

The storage media 106 also stores destination computer document information 115, which contains information identifying documents that are stored at a particular one of the destination computers 102. For example, the destination computer document information 115 can indicate which component documents are available at the particular destination computer 102. The destination computer document information 115 can be used to determine which component documents of the modular document 108 are to be sent to the particular destination computer 102 when sending a copy of the modular document 108 to the particular destination computer 102.

The source computer 100 further includes a processor 114 connected to the storage media 106. The processor 114 is connected to a network interface 116 that allows the source computer 100 to communicate over the data network 104 with the destination computers 102.

In addition, the source computer 100 includes a modular document version control software 117 that provides version control for component documents of a modular document. The modular document version control software 117 is able to add version information into the modular document to identify versions of corresponding component documents.

The source computer 100 further includes an adaptive document packaging software 118 that is executable on the processor 114. The adaptive document packaging software 118 is able to perform adaptive packaging of component documents of a modular document that is to be transmitted from the source computer 100 to the destination computer 102, where "adaptive packaging" refers to the process of identifying a subset of the component documents that are not already available at the destination computer 102. The adaptive document packaging software 118 can access the destination computer document information 115 to determine which component documents are already available at the destination computer 102.

As further shown in FIG. 1, a destination computer 102 includes a storage media 120 that contains one or more documents 122, which can be component documents of a modular document. The storage media 120 is connected to a processor 124, which is connected to a network interface 126 to allow the destination computer 102 to communicate over the data network 104. The destination computer 102 also includes application software 128 that is executable on the processor 124. The application software 128 can be a word processing software, a web browser, or any other software that is able to process and present modular documents.

The destination computer 102 further has a reconstruction software 129 that is executable on the processor 124 to reconstruct a modular document from component documents. The reconstruction software 129 is able to take into account version information of component documents to allow the reconstruction software 129 to select appropriate versions of component documents to use when reconstructing a modular document.

As shown in FIG. 1, the component documents 122 stored locally in the storage media 120 of the destination computer 102 are associated with version information 123. In some scenarios, when the reconstruction software 129 is reconstructing a modular document, the reconstruction software 129 accesses the version information 123 associated with one or more of the locally stored component documents 122 as well as version information of modular document(s) received from the source computer 100 to determine which version of the component document(s) to use when reconstructing the modular document.

The selection of the version of each such component documents 122 to use can be based on policy information 125 stored in the storage media 120. For example, the policy can be based on the type of application for the type of modular document. If the modular document is a template, then the policy information 125 would indicate that the template should always use the latest version of any component document of the template. On the other hand, if the modular document is a previously created document, then the policy information 125 can specify that the previously created modular document should use an earlier version of a particular component document. Alternatively, the policy information 125 can specify that the component documents to use should be the latest versions of the component documents. As yet another alternative, the policy information 125 can specify that the version of a modular document to use should be the version received from the source computer 100. As another example, the policy information 125 can specify that the version to use should be a version stored locally at the destination computer 102.

Figure 2:
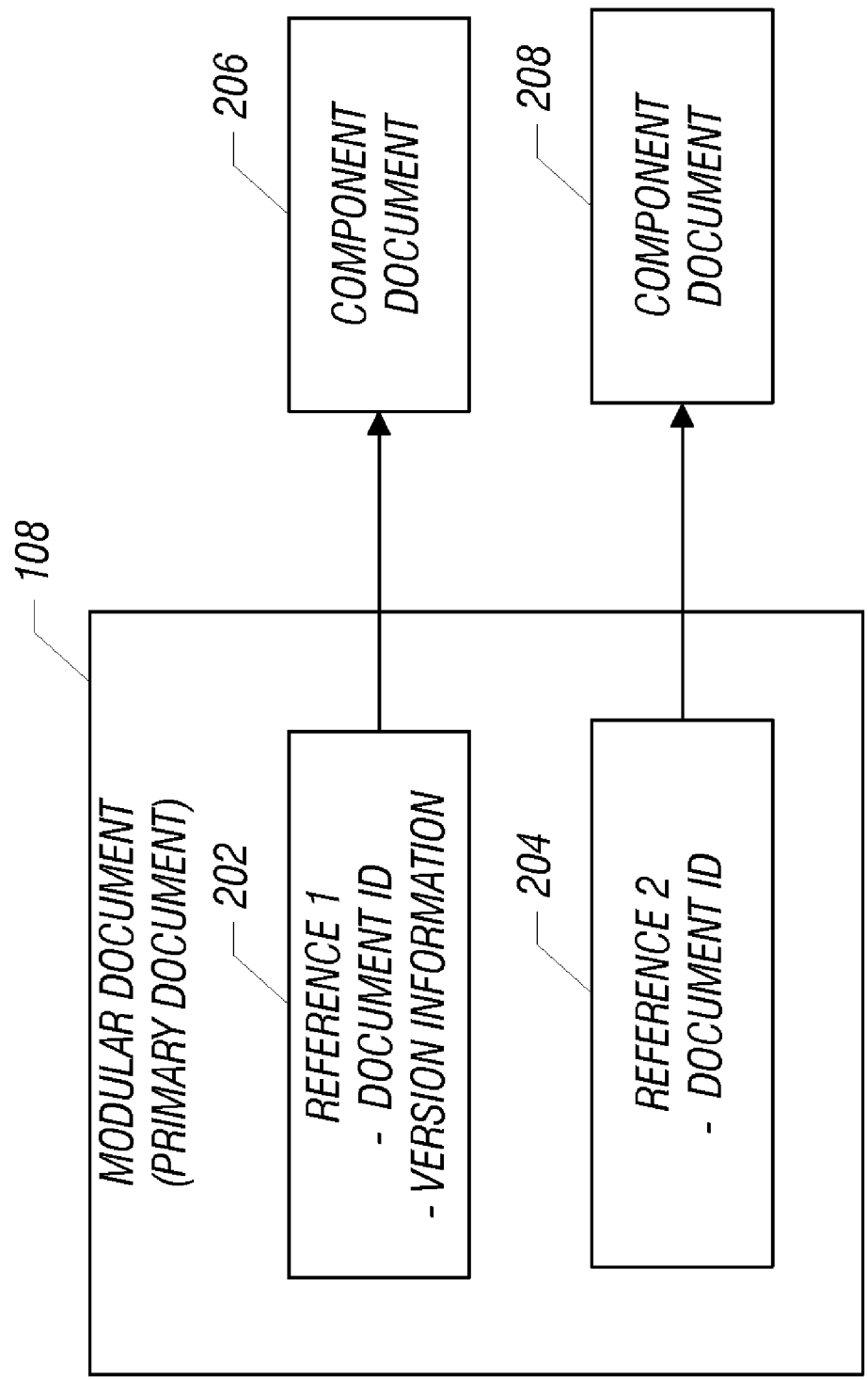
FIG. 2 is a schematic diagram of a modular document containing references to component documents, where at least one of the references contains version information according to an embodiment.

FIG. 2 illustrates an example of the modular document 108. The modular document 108 (which is represented as a primary document) contains references 202, 204 to corresponding component documents 206 and 208. In the example of FIG. 2, the first reference 202 contains a document identifier (which uniquely identifies the component document 206) and version information (to identify the version of the component document 206). The second reference 204 contains a document identifier for the component document 208. However, in the example of FIG. 2, the second reference 204 does not include version information. In some implementations, some component documents of a modular document are associated with version information while other component documents are not associated with version information. In other implementations, all component documents of the modular document are associated with version information.

Although FIG. 2 shows version information of a component document being contained in a reference (e.g., 202) to the component document, in an alternative implementation, the version information can be stored elsewhere. More generally, version information is associated with a reference to a component document, where the association can mean that the version information is stored as part of the reference, or is stored elsewhere but linked to the reference.

FIG. 3 is a flow diagram of a process according to an embodiment performed at the source computer 100. Source computer 100 provides (at 302) a modular document that is composed of multiple component documents. The modular document version control software 117 in the source computer 100 is able to associate (at 304) version information with reference(s) in the modular document to corresponding component document(s). In associating version information with a reference to a component document, the modular document version control software 117 can add timestamp information which can be used for comparing which version of the component document is the most recent. Note that not all references have to include version information.

FIG. 4 is a flow diagram of a process according to another embodiment performed at the source computer 100 for packaging a modular document for distribution to a destination computer 102. The source computer 100 receives (at 402) a request to send the modular document to a destination computer 102. The request can be received from a user at the source computer 100, such as through a graphical user interface (GUI), which allows a user to identify destination computers to which modular documents are to be sent. Alternatively, the request to send a modular document to a destination computer can be received from application software executing in the source computer 100. In response to the request to send a modular document to a destination computer, the adaptive document packaging software 118 in the source computer 100 determines (at 404) based on inter-document references whether multiple versions of any component document is referenced. A modular document can refer to component documents that are themselves modular documents. These referenced modular documents can point to different versions of the same additional component document.

An example of such a scenario is shown in FIG. 6, in which modular document A has reference B to another modular document B, and reference C to another modular document C. Modular document B has reference 1 to component document 1, where reference 1 is associated with version information that indicates version Y for component document 1. Modular document C has reference 1 that also refers to component document 1—however, the version information associated with reference 1 of modular document C indicates version X for component document 1. Thus, the inter-document references of the various documents shown in FIG. 6 indicate that multiple versions of component document 1 are referenced: version X and version Y.

Instead of the different versions of component document 1 being represented as two separate documents, a component document can be considered to include all its versions. In one implementation, the different versions can correspond to different pieces of the component document. In an alternative implementation, different versions of a reference version of the component document can be represented as corresponding sets of changes from the reference version.

Figure 7:
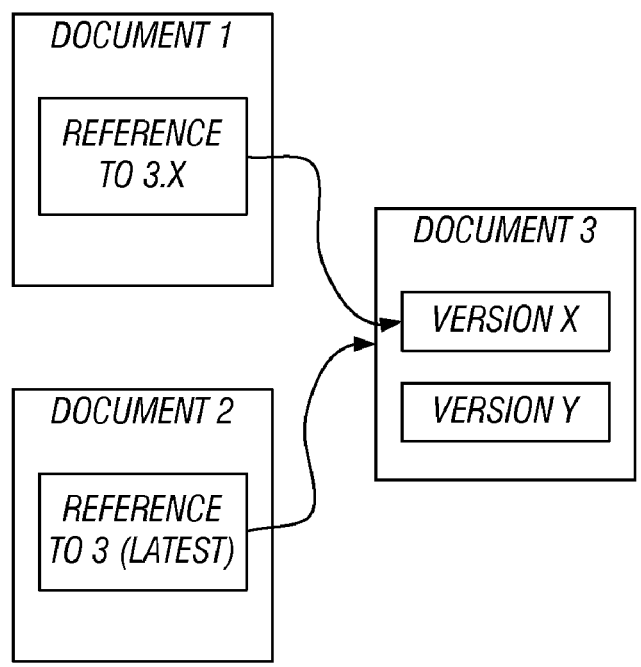

FIG. 7 depicts an example of multiple versions being contained in the same document. In the example of FIG. 7, document 1 contains a reference to version X of document 3 ("3.X"), and document 2 contains a reference to a latest version of document 3 (which may be either version X or Y).

Referring again to FIG. 4, the adaptive document packaging software 118 then creates (at 406) a package of the modular document and at least a subset of the component documents, including multiple versions of one or more component documents if such multiple versions are referenced as determined at 404. The subset of component documents that is included in the package may exclude documents that are already available at the destination computer 102. Using the destination computer document information 115 (or some other technique), the adaptive document packaging software 118 can determine which component documents (and even more specifically, which versions of component documents) are already available at the destination computer 102. The adaptive document packaging software 118 can omit such component documents (or versions of component documents) from the package for the modular document that is to be distributed to a destination computer 102. Omitting component documents that are already available at a destination computer conserves network bandwidth of the data network 104.

After the package has been created, the source computer 100 sends (at 408) the package for the modular document to the destination computer 102.

FIG. 5 shows a process performed at the destination computer 102. The destination computer 102 receives (at 502) a package that contains a modular document and at least a subset of the component documents. The content of the received package is stored (at 503) in the destination computer 102.

At some later point in time, in response to a request to present the modular document, the modular document reconstruction software 129 in the destination computer 102 is invoked (at 504). The modular document reconstruction software 129 determines (at 504) whether multiple versions exist for any of the component documents of the modular document (where the multiple versions include at least one version included in the received package and at least one version stored locally at the destination computer 102). For any such component documents, one of the multiple versions is selected (at 506) to use for reconstructing the modular document. Next, the modular document reconstruction software 129 reconstructs (at 508) the modular document.

Note that as discussed above, it may be possible that the package itself contains multiple versions of a particular component document because such multiple versions are explicitly referenced by different documents of the modular document. In such cases, the explicitly referenced multiple versions may each be used in reconstructing the modular document. Alternatively, the reconstruction software 129 in the destination computer 102 can choose just one of the explicitly referenced multiple versions to use.

As discussed above, a modular document is made up of component documents. In some embodiments, each document (a modular document or a component document) can include parts. For example, the parts of a document can include a data part, a style part, an image part, and so forth. A document may be constructed from parts of another document. For example, one document may refer to and re-use just the style and image parts of another document. As a result, in these embodiments, a dependency reference can identify both a component document plus the part of the component document to be used in the construction. More generally, a "part" of a document refers to a portion less than the entirety of the document.

Figure 8:
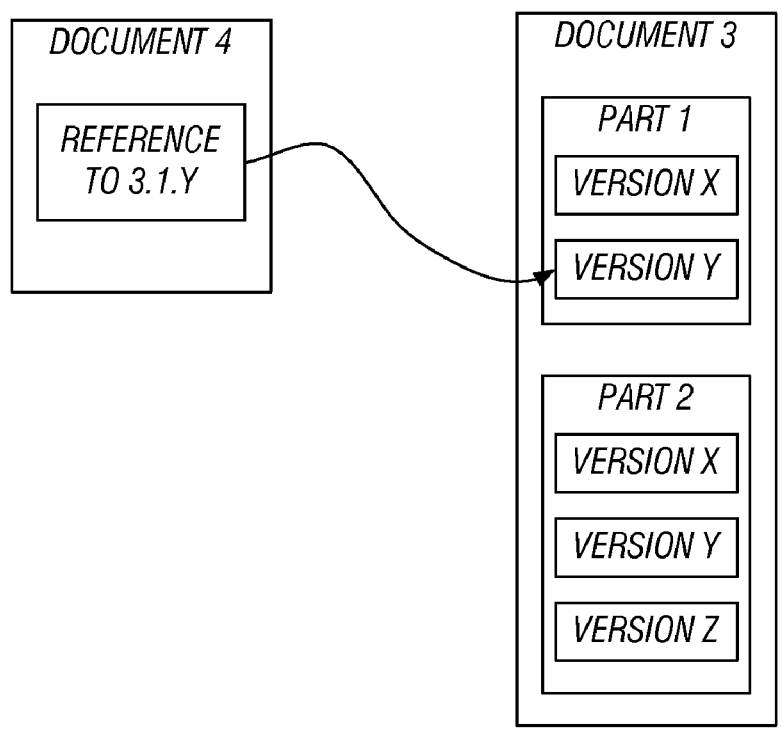
FIG. 8 shows an example of a first document having a reference to a part of another document, according to another embodiment.

An example of the above is shown in FIG. 8, in which document 3 has part 1 and part 2. Moreover, part 1 has two versions: version X and version Y, and part 2 has three versions: version X, version Y, and version Z. Document 4 in FIG. 8 contains a reference to 3.1.Y, which is a reference to document 3, part 1, version Y. Thus, in this embodiment, the reference contains a document identifier, a part identifier, and possibly a version identifier.

The techniques for handling of versions of component documents as discussed further above are applicable for handling versions of document parts. When a document is included in a package to be sent from a source computer to a destination computer, the package may include one or more versions of each of the parts of the document. Determining which part versions to include can follow the same principles as discussed above in connection with FIG. 4.

Instructions of software described above (including the adaptive document packaging software 118, modular document version control software 117, application software 128, and reconstruction software 129 of FIG. 1) are loaded for execution on a processor (such as processor 114 or 126 in FIG. 1). The processor includes microprocessors, microcontrollers, processor modules or subsystems (including one or more microprocessors or microcontrollers), or other control or computing devices. As used here, a "processor" can refer to a single component or to plural components, (e.g., one or multiple CPUs in the one or more computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
providing, by a first electronic device, a modular document composed of plural component documents that are combined to allow presentation of the modular document, wherein the modular document contains references to the component documents;
determining whether plural different versions of a particular one of the component documents is referenced in the modular document; and
in response to determining that plural different versions of the particular component document is referenced, associating plural version information with corresponding ones of the references to identify the corresponding plural different versions of the particular component document.

2. The method of claim 1, further comprising sending a representation of the modular document including the plural version information from the first electronic device over a network to a second electronic device.

3. The method of claim 1, further comprising associating a global unique identifier with each of the references associated with the particular component document, wherein the global unique identifier identifies the particular component document.

4. The method of claim 1, wherein associating the plural version information comprises associating the plural version information that include corresponding timestamps.

5. The method of claim 1, further comprising:
creating a package including the modular document and at least a subset of the plural component documents; and
sending the package from the first electronic device to a second electronic device over a network.

6. The method of claim 5, further comprising:
including in the subset just the component documents that are not available at the second electronic device.

7. The method of claim 1, wherein at least a given one of the plural component documents has plural parts, and wherein at least one of the parts is associated with multiple versions, the method further comprising:
providing, in the modular document, a reference to one of the multiple versions of the at least one part.

8. A method comprising:
providing, by a first electronic device, a modular document composed of plural component documents that are combined to allow presentation of the modular document, wherein the modular document contains references to the component documents;
associating version information with at least one of the references to identify one of plural versions of a corresponding particular one of the component documents;
creating a package including the modular document and at least a subset of the plural component documents;
sending the package from the first electronic device to a second electronic device over a network;
determining whether references in component documents of the modular document refer to multiple versions of a given component document; and
in response to determining that the references in the component documents of the modular document refer to multiple versions of the given document, including the multiple versions of the given document in the package.

9. A first electronic device comprising:
a network interface to receive, from a second electronic device, a modular document composed of plural component documents that are combined to allow presentation of the modular document, wherein at least a given one of the plural component documents is associated with version information; and a processor to:

according to the version information, select one of multiple versions of the given component document to be used;

construct the modular document using the plural component documents including the selected version of the given component document; and a storage media to locally store one of the versions of the given component document, wherein selection of one of the multiple versions comprises selection between the version of the given component document received from the second electronic device and the version of the given component document stored locally at the first electronic device.

10. The first electronic device of claim 9, wherein the storage media is to further store policy information, and wherein the processor is configured to select one of the multiple versions of the given component document by using the policy information.

11. The first electronic device of claim 10, wherein the policy information specifies that a latest version of the given component document is to be used.

12. The first electronic device of claim 10, wherein the policy information specifies that different versions of the given component document are to be used for different applications.

13. The first electronic device of claim 10, wherein the policy information specifies that different versions of the given component document are to be used for different types of modular documents.

14. The first electronic device of claim 9, wherein the received modular document includes a package that includes a representation of the modular document and a subset of at least some of the plural component documents.

15. An article comprising at least one non-transitory computer-readable storage medium containing instructions that upon execution by a processor cause a first electronic device to:

receive a request to send a particular modular document to a second electronic device, wherein the particular modular document is composed of plural component documents that are combined to allow presentation of the particular modular document, wherein the plural component documents include further modular documents, and wherein the further modular documents contain respective references to different versions of a given component document;

create a package that includes the particular modular document and a subset of at least some of the plural component documents, wherein version information is associated with at least a particular one of the component documents;

include the different versions of the given component document in the package;

associate different version information for the given component document with corresponding references in the further modular documents; and send the package to the second electronic device.

16. The article of claim 15, wherein the particular modular document contains references to corresponding ones of the plural component documents, wherein the version information associated with the particular component document is associated with the reference to the particular component document.

* * * * *